(12) United States Patent
Ri

(10) Patent No.: US 7,326,899 B2
(45) Date of Patent: Feb. 5, 2008

(54) LASER SCANNING MICROSCOPE AND IMAGE ACQUIRING METHOD OF LASER SCANNING MICROSCOPE

(75) Inventor: Sei Ri, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/484,161

(22) Filed: Jul. 11, 2006

(65) Prior Publication Data

US 2007/0007428 A1    Jan. 11, 2007

(30) Foreign Application Priority Data

Jul. 11, 2005   (JP)   ............... 2005-202004

(51) Int. Cl.
  G02B 27/40    (2006.01)
  G02B 27/64    (2006.01)
  G02B 21/00    (2006.01)
  G02B 21/06    (2006.01)

(52) U.S. Cl. .............. 250/201.3; 359/368; 359/385; 359/388; 359/389

(58) Field of Classification Search ............... 250/216, 250/201.3, 201.9, 458.1, 459.1, 461.1; 359/385, 359/368, 388, 389

See application file for complete search history.

(56) References Cited

U.S. PATENT DOCUMENTS

| | | | |
|---|---|---|---|
| 4,827,125 A | 5/1989 | Goldstein | |
| 5,062,715 A | 11/1991 | Nakata et al. | |
| 6,094,300 A * | 7/2000 | Kashima et al. | 359/385 |
| 6,751,016 B2 * | 6/2004 | Fukuyama et al. | 359/368 |
| 6,771,417 B1 | 8/2004 | Wolleschensky et al. | |
| 6,909,542 B2 * | 6/2005 | Sasaki | 359/385 |
| 7,034,270 B2 * | 4/2006 | Sasaki | 250/201.3 |
| 7,057,806 B2 * | 6/2006 | Atkinson | 359/368 |
| 2001/0009473 A1 | 7/2001 | Ogino | |
| 2003/0067607 A1 | 4/2003 | Wolleschensky et al. | |
| 2003/0107789 A1 | 6/2003 | Hishioka et al. | |
| 2003/0197924 A1 * | 10/2003 | Nakata | 359/368 |
| 2004/0184163 A1 | 9/2004 | Nishioka | |
| 2005/0122579 A1 | 6/2005 | Sasaki | |
| 2006/0239324 A1 | 10/2006 | Akagawa et al. | |

FOREIGN PATENT DOCUMENTS

| | | |
|---|---|---|
| DE | 101 50 934 A1 | 4/2003 |
| JP | 11-101942 A | 4/1999 |
| JP | 2005-157146 A | 6/2005 |
| JP | 2005-352034 A | 12/2005 |

OTHER PUBLICATIONS

U.S. Appl. No. 11/323,573, filed Dec. 30, 2005; S. Ri; Optical Microscope.

* cited by examiner

*Primary Examiner*—John R. Lee
(74) *Attorney, Agent, or Firm*—Frishauf, Holtz, Goodman & Chick, P.C.

(57) ABSTRACT

Provided is a laser scanning microscope having a first focusing-position control unit; and a confocal detecting unit. The first focusing-position control unit shifts a first focusing position of a laser beam on a sample in a direction of an optical axis of an objective lens. The confocal detecting unit has a confocal aperture for a confocal detection of a light emitted from the first focusing position. The microscope may include a second focusing-position control unit shifts a second focusing position of the light emitted from the first focusing position focused by the confocal detecting unit in a direction of an optical path thereof.

19 Claims, 5 Drawing Sheets

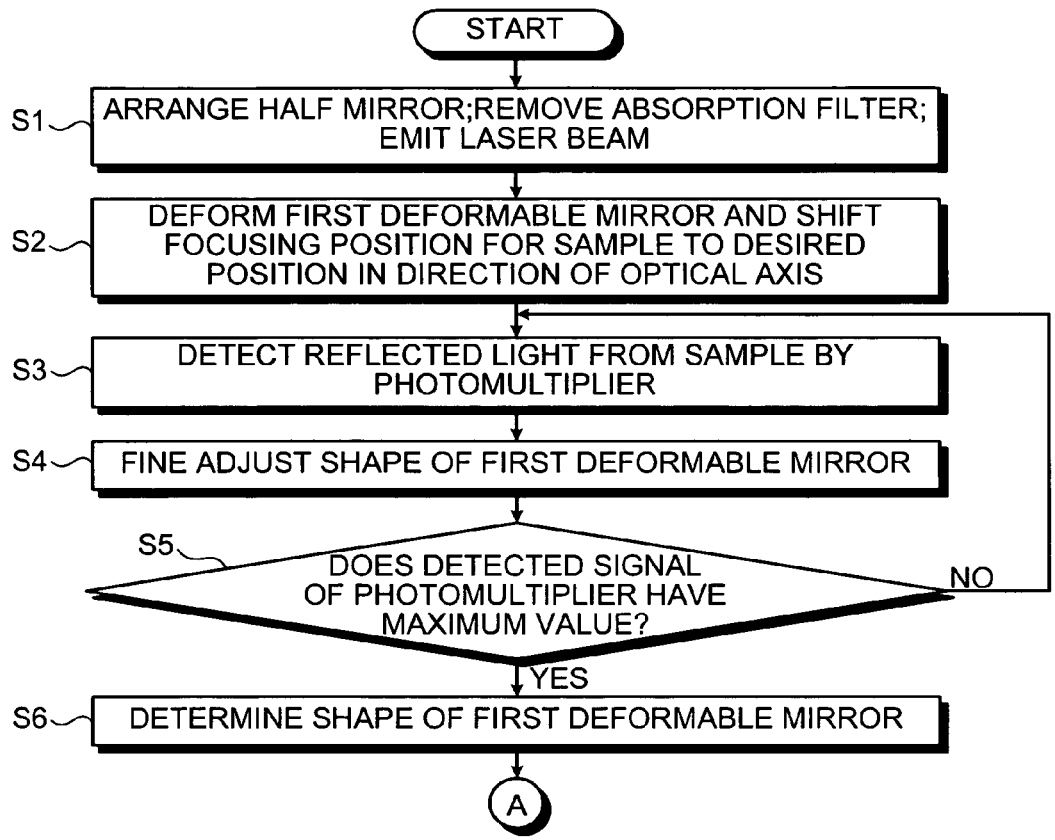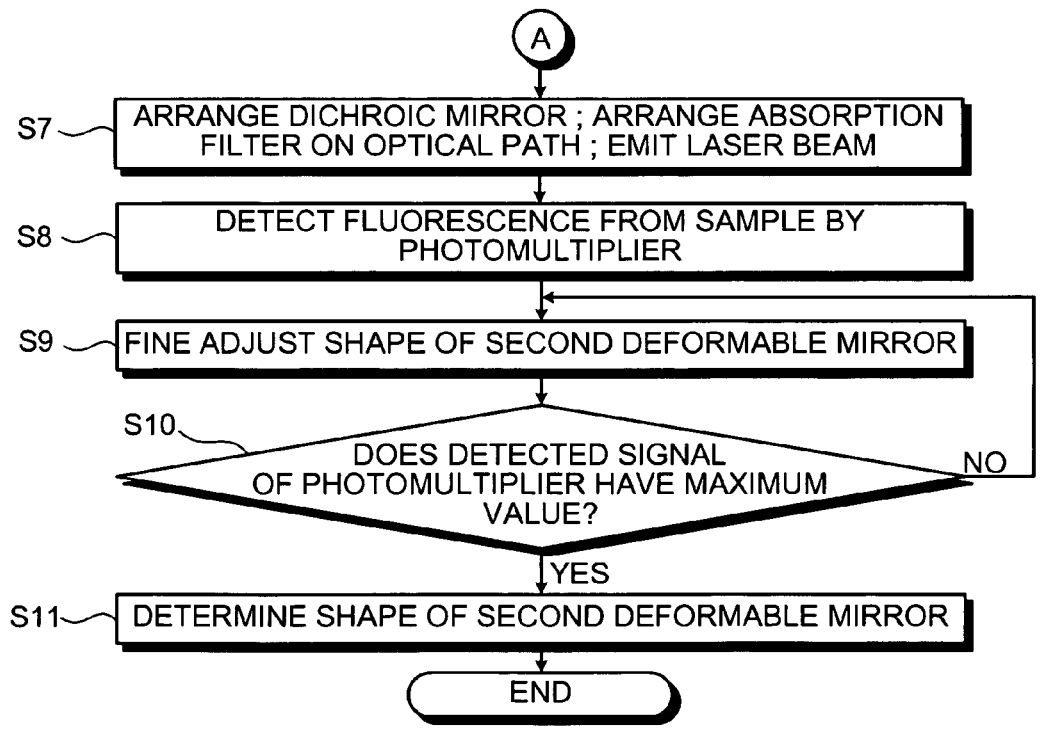

LASER SCANNING MICROSCOPE AND IMAGE ACQUIRING METHOD OF LASER SCANNING MICROSCOPE

CROSS-REFERENCE TO RELATED APPLICATIONS

This application is based upon and claims the benefit of priority from Japanese Patent Application No. 2005-202004, filed Jul. 11, 2005, the entire contents of which are incorporated herein by reference.

BACKGROUND OF THE INVENTION

1. Field of the Invention

The present invention relates to a laser scanning microscope that can correct aberration and can change a focusing position of the objective lens.

2. Description of the Related Art

Recently, a laser scanning microscope that can acquire an image with higher quality is demanded; therefore, a laser scanning microscope that can correct aberration remained in an optical element (e.g., objective lens) focusing a light emitted from a light source on a sample has been used.

A microscope disclosed in JP-A No. H11-101942 (KO-KAI) (U.S. Pat. No. 6,771,417) is known as an optical microscope that can correct the aberration of the objective lens. Specifically, in the microscope disclosed, a deformable mirror used as a wavefront modulator is arranged in front of the objective lens of the microscope. Then, the aberration in the microscope is corrected while shifting a focusing position of the objective lens by deforming a surface of the deformable mirror to modulate a wavefront of light.

The aberration is caused in the laser scanning microscope by a difference between a refractive index of a cover glass holding a fluorescent sample and a refractive index of the fluorescent sample itself, or by a difference between the refractive indices just mentioned and a refractive index of air, for example, especially when the fluorescent sample is observed. Furthermore, the sample might not be ideally illuminated with an illuminating light due to the aberration.

Further, when a focusing position of the objective lens is shifted by using the deformable mirror in the laser scanning microscope, a real NA (Numerical Aperture) of the objective lens is changed and a diffraction diameter of a laser beam at a confocal pinhole is slightly changed.

On the other hand, there is a problem that a focusing position is slightly deviated in a direction of an optical axis for each of the laser beams with different wavelengths due to color aberration of an optical system when a laser beam with one wavelength is switched to a laser beam with another wavelength.

SUMMARY OF THE INVENTION

A laser scanning microscope according to one aspect of the present invention includes a light source that generates a laser beam; an objective lens that focuses the laser beam on a sample; an optical scanning unit that two-dimensionally scans the sample by the laser beam; a first focusing-position control unit that is provided on an optical path of the laser beam, and shifts a first focusing position of the laser beam on the sample in a direction of an optical axis of the objective lens; a splitter element that splits at least one of an observation light and a reflected light from the optical path of the laser beam, the observation light having a different wavelength from a wavelength of the laser beam and being emitted from the first focusing position, the reflected light being reflected from the first focusing position; a confocal detecting unit that has a confocal aperture for a confocal detection of a light from the first focusing position; a second focusing-position control unit that is provided on an optical axis between the splitter element and the confocal aperture, and matches a second focusing position of the observation light with the confocal aperture, the observation light being focused with respect to the confocal detecting unit; and a light selecting unit that selects the light detected by the confocal detecting unit.

A laser scanning microscope according to another aspect of the present invention includes a light source that generates a multiwavelength laser beam containing plural wavelengths; a wavelength extracting unit that extracts a laser beam with one or more wavelength from the multiwavelength laser beam; an objective lens that focuses the laser beam on a sample; an optical scanning unit that two-dimensionally scans the sample by the laser beam; a first focusing position control unit that is provided on an optical path of the laser beam, and shifts a focusing position of the laser beam on the sample in a direction of an optical axis of the objective lens to eliminate deviation in the focusing position of the laser beam with each wavelength in a direction of the optical axis with respect to the focusing position of the laser beam with a reference wavelength; a splitter element that splits an observation light from the optical path of the laser beam, the observation light having a different wavelength from the laser beam and being emitted from the focusing position; a confocal detecting unit that has a confocal aperture for a confocal detection of a light from the focusing position; and a light selecting unit that selects the light detected by the confocal detecting unit.

An image acquiring method of a laser scanning microscope according to still another aspect of the present invention includes focusing a laser beam emitted by a light source on a sample through an objective lens; performing a confocal detection of a light emitted from a first focusing position through a confocal aperture while two-dimensionally scanning the first focusing position on the sample by the laser beam; shifting the first focusing position in a direction of an optical axis of the objective lens so that light intensity passing through the confocal aperture is maximized with respect to the laser beam reflected at the first focusing position; and shifting a second focusing position of an observation light in a direction of an optical path of the observation light so that the light intensity passing through the confocal aperture is maximized with respect to the observation light, the observation light having a different wavelength from a wavelength of the laser beam and being emitted from the first focusing position.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2A is a flowchart showing a procedure of an operation of the laser scanning microscope shown in FIG. 1;

FIG. 2B is a flowchart showing a procedure of an operation of the laser scanning microscope shown in FIG. 1;

DETAILED DESCRIPTION OF THE PREFERRED EMBODIMENTS

Embodiments of the present invention are explained hereinafter with reference to the accompanying drawings.

Figure 1:
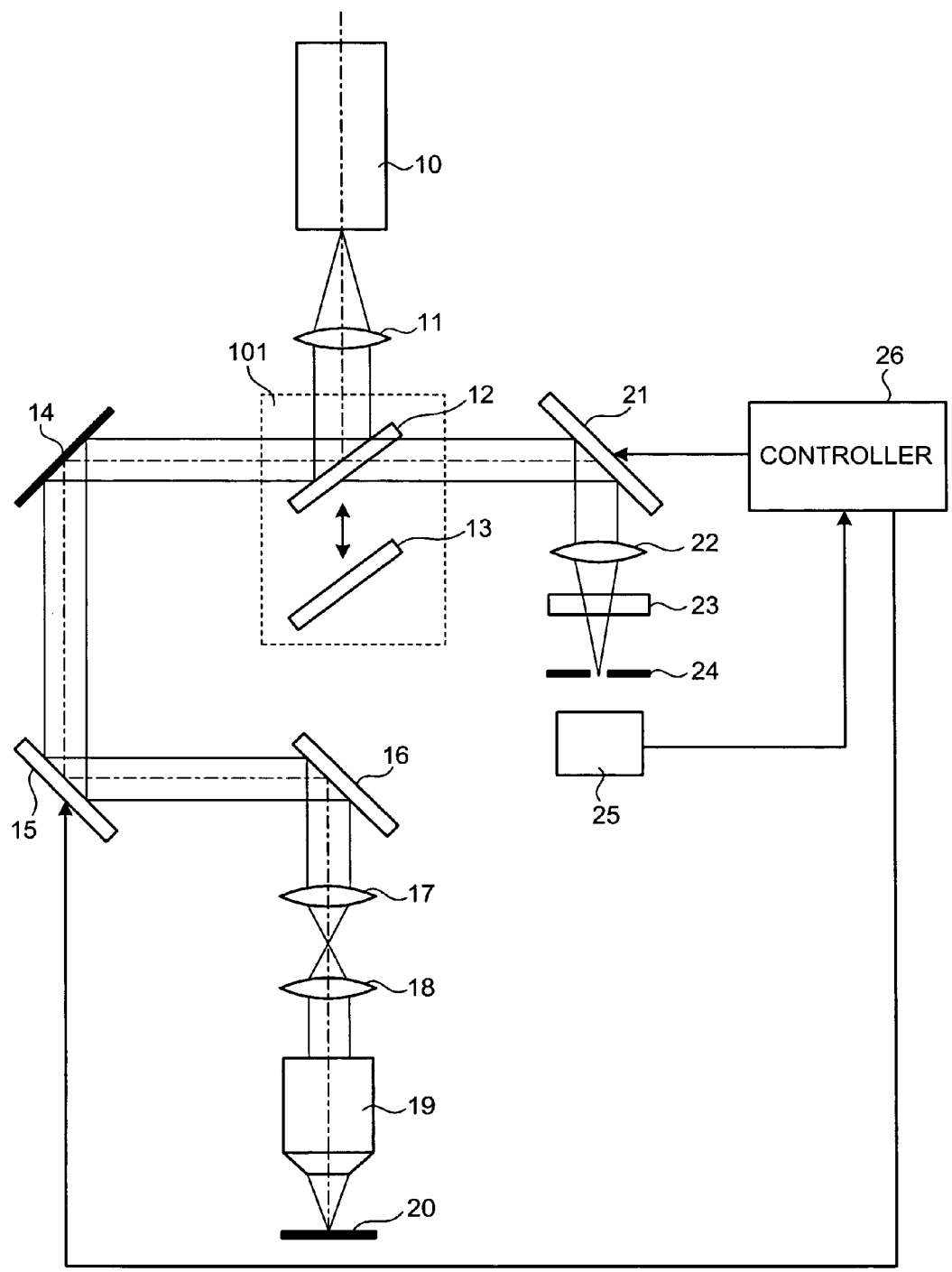
FIG. 1 is a schematic drawing showing a configuration of a laser scanning microscope according to a first embodiment of the present invention.

FIG. 1 is a schematic drawing showing a configuration of a laser scanning microscope according to a first embodiment of the present invention. Referring to FIG. 1, a laser beam source, which is represented by "10", generates a laser beam with a wavelength capable of exciting a fluorescent dye described later in a sample 20. A collimate optical system 11 is arranged on an optical path of the laser beam emitted by the laser beam source 10. The collimate optical system 11 produces a complete parallel beam from the laser beam emitted by the laser beam source 10, while changing the beam diameter.

An optical element switching unit 101, which is a light selecting unit, is arranged on an optical path of the parallel beam from the collimate optical system 11. The optical element switching unit 101 includes a half mirror 12 and a dichroic mirror 13. The half mirror 12 and the dichroic mirror 13 can be selectively switched to be arranged on the optical path. When a focusing position of an objective lens 19 described later is changed and aberration thereof is corrected, the half mirror 12 is arranged on the optical path by the optical element switching unit 101. On the other hand, when aberration is corrected with respect to fluorescence of the sample 20, the dichroic mirror 13 is arranged on the optical path. Here, the half mirror 12 has a transmittance of substantially 50% independent of wavelength; reflects the laser beam emitted by the laser beam source 10; and has a property of transmitting a light from the sample 20. On the other hand, the dichroic mirror 13 reflects the laser beam from the laser beam source 10, and has a property of transmitting a light with a predetermined wavelength, among the light from the sample 20. Here, the light with the predetermined wavelength is a light with a fluorescent wavelength emitted by the sample 20. FIG. 1 shows an arrangement when the half mirror 12 is arranged on the optical path.

A reflecting mirror 14 and a first deformable mirror 15 are arranged on a reflecting optical path viewed from a laser beam source 10 side of the half mirror 12 (dichroic mirror 13). Here, the first deformable mirror 15 represents a wavefront modulator, which is a first focusing position control unit. The first deformable mirror 15 controls the focusing position of the objective lens 19. Here, the focusing position controlled by the first deformable mirror 15 is on the sample 20, and shifted in a direction of an optical axis of the objective lens 19. When a reflecting surface of the first deformable mirror 15 is flat, the first deformable mirror 15 does not have optical power, so that a light reflected by the reflecting surface is output as a parallel beam. On the other hand, when a voltage is applied to an electrode not shown of the first deformable mirror 15, the reflecting surface thereof is deformed (bent), so that the light reflected by the reflecting surface is output as a light that diverges or as a light that converges.

An optical scanning unit 16, which performs an optical scan, is arranged on a reflecting light path of the first deformable mirror 15. The optical scanning unit 16 has, for example, two mirrors that deflect a light in two directions orthogonal to each other, for example, and the laser beam focused on the sample 20 two-dimensionally scans the sample 20 by the mirrors.

A pupil projection lens 17, an intermediate imaging lens 18, and the objective lens 19 are arranged on the optical path of the laser beam that two-dimensionally scans the sample 20 by the optical scanning unit 16. A pupil of the objective lens 19 is projected on the optical scanning unit 16 by the pupil projection lens 17 and the intermediate imaging lens 18. Consequently, the laser beam that two-dimensionally scans the sample 20 by the optical scanning unit 16 is focused at a focusing position on the sample 20 placed on a stage not shown through the pupil projection lens 17, the intermediate imaging lens 18, and the objective lens 19. Then, the light from the sample 20 returns to the half mirror 12 (dichroic mirror 13) along the optical path described hereinbefore in a reversed direction thereof through the objective lens 19, the intermediate imaging lens 18, the pupil projection lens 17, the optical scanning unit 16, the first deformable mirror 15, and the reflecting mirror 14.

A second deformable mirror 21 is arranged on a transmitting optical path viewed from a sample 20 side of the half mirror 12 (dichroic mirror 13). Here, the second deformable mirror 21 represents a wavefront modulator, which is a second focusing position control unit. Furthermore, an imaging lens 22, an absorption filter 23, a confocal pinhole 24, and a photomultiplier 25 are arranged on the reflecting optical path of the second deformable mirror 21. The photomultiplier 25 represents a light detecting unit. The confocal pinhole 24 and the photomultiplier 25 form a confocal detecting unit.

The second deformable mirror 21 controls a focusing position of the imaging lens 22. Here, the focusing position controlled by the second deformable mirror 21 is at the confocal pinhole 24, and the focusing position is shifted in a direction of an optical axis of the imaging lens 22. As similar to the first deformable mirror 15, when a reflecting surface of the second deformable mirror 21 is flat, the second deformable mirror 21 does not have optical power, so that a light reflected by the reflecting surface is output as a parallel beam. On the other hand, when a voltage is applied to an electrode not shown of the second deformable mirror 21, the reflecting surface thereof is deformed (bent), so that the light reflected by the reflecting surface is output as a light that diverges or as a light that converges. The absorption filter 23 selects a desirable wavelength to be detected from the light emitted from the sample 20. The confocal pinhole 24 is arranged at a position optically conjugate with a focal point of the objective lens 19, and a focused component among the light emitted from the sample 20 passes through the confocal pinhole 24. Consequently, a component that is not focused is blocked so that a high space resolving power is obtained. The photomultiplier 25 detects intensity of the light passing through the confocal pinhole 24; converts the detected light intensity to an electric signal; and outputs the electric signal.

A controller 26, which is a control unit, is connected to the first deformable mirror 15, the second deformable mirror 21, and the photomultiplier 25. The controller 26 reads the electric signal from the photomultiplier 25, and controls the deformation of a shape of the surface of the first deformable mirror 15 and the second deformable mirror 21 in such a way that the electric signal are maximized. In other word, the controller 26 controls the deformation in such a way that light intensity passing through the confocal pinhole 24 is maximized. Here, the controller 26 applies the voltage to the electrode not shown of the first deformable mirror 15 and the second deformable mirror 21 to fine adjust the reflecting surface of the first deformable mirror 15 and the second deformable mirror 21.

An operation of the laser scanning microscope configured as described hereinbefore is explained with reference to FIGS. 2A and 2B. FIGS. 2A and 2B are flowcharts showing procedures of the operation of the laser scanning microscope according to the first embodiment.

The shifting of the focusing position of the objective lens 19 and the correction of the aberration thereof are explained first as a first step. Here, the half mirror 12 is arranged on the optical path by the optical-element switching unit 101, and the laser beam is emitted from the laser beam source 10 after removing the absorption filter 23 from the optical path (step S1). At the moment, the second deformable mirror 21 is not controlled to deform so that the second deformable mirror 21 is used as a normal reflecting mirror.

The laser beam emitted from the laser beam source 10 is reflected by the half mirror 12; is reflected by the reflecting mirror 14 and the first deformable mirror 15; is incident on the optical scanning unit 16; two-dimensionally scans the sample 20 by the two mirrors; is incident on the objective lens 19 through the pupil projection lens 17 and the intermediate imaging lens 18; and is focused on the sample 20, sequentially. At the moment the voltage is applied to the electrode not shown of the first deformable mirror 15, and the reflecting surface thereof is deformed to a curved surface with a desired curvature. Thus, the focusing position for the sample 20 is shifted to a desired position along the optical axis (step S2). When the focusing position does not need to be shifted, step S2 can be skipped.

The reflected light from the sample 20 transmits through the objective lens 19 and comes into the half mirror 12 through the intermediate imaging lens 18, the pupil projection lens 17, the optical scanning unit 16, the first deformable mirror 15, and the reflecting mirror 14, while traveling in the reversed direction of the light described hereinbefore. Then, the reflected light transmits through the half mirror 12; is reflected by the second deformable mirror 21; and is focused at the confocal pinhole 24 through the imaging lens 22. Furthermore, the intensity of the light passing through the confocal pinhole 24 is detected by the photomultiplier 25, and the detected light intensity is output as the electric signal (step S3).

While keeping the state described hereinbefore, the voltage is applied to the electrode not shown of the first deformable mirror 15 in order to fine adjust the shape of the reflecting surface (step S4).

The electric signal output from the photomultiplier 25 is input to the controller 26. The controller 26 controls the voltage applied to the electrode not shown of the first deformable mirror 15 in such a way that the electric signal from the photomultiplier 25 is maximized. In other word, the controller 26 controls the voltage in such a way that the light intensity of the light passing through the confocal pinhole 24 is maximized. That is to say, the controller 26 determines whether the detected signal of the photomultiplier 25 has a maximum value or not (step S5), and the process returns to step S4 when the detected signal does not have the maximum value (No in step S5). On the other hand, the shape of the surface of the first deformable mirror 15 is determined (step S6) when the detected signal from the photomultiplier 25 has the maximum value (Yes in step S5). Consequently, aberration caused by a difference between a refractive index of a cover glass holding the fluorescent sample and a refractive index of the fluorescent sample, by a difference between the refractive indices just mentioned and a refractive index of air, and by shifting of the focusing position of the laser beam along the optical axis by the first deformable mirror 15, can be corrected; therefore, the sample 20 can be ideally illuminated with the illuminating light.

The correction of aberration with respect to the fluorescence of the sample 20 is explained hereinafter as a second step. Here, instead of the half mirror 12, the dichroic mirror 13 is arranged on the optical path by the optical element switching unit 101. Then, the laser beam is emitted from the laser beam source 10 after the absorption filter 23 is arranged on the optical path (step S7). At the moment, the first deformable mirror 15 is used while the shape of the surface thereof is determined at step S6.

As similar to the laser beam described hereinbefore, the laser beam emitted from the laser beam source 10 is incident on the objective lens 19 and focused on the sample 20. Further, the light from the sample 20 is incident on the dichroic mirror 13. Only a light with a predetermined wavelength among the light from the sample 20 passes through the dichroic mirror 13. Here, the light with the predetermined wavelength represents a light with a fluorescent wavelength emitted from the sample 20. The light that passes through the dichroic mirror 13 is reflected by the second deformable mirror 21, is incident on the imaging lens 22 and the absorption filter 23, and is focused at the confocal pinhole 24. Then, the intensity of the light passing through the confocal pinhole 24 is detected by the photomultiplier 25, and is output as the electric signal (step S8).

Here, the electric signal output from the photomultiplier 25 is input to the controller 26. The controller 26 controls the voltage applied to the electrode not shown of the second deformable mirror 21 in such a way that the electric signal from the photomultiplier 25 is maximized. In other word, the controller 26 controls the voltage in such a way that the light intensity passing through the confocal pinhole 24 is maximized. Consequently, the shape of the surface of the second deformable mirror 21 is deformed. That is to say, the controller 26 determines whether the detected signal of the photomultiplier 25 has a maximum value or not (step S10) after fine adjusting the shape of the surface of the second deformable mirror 21 (step S9). When the detected signal does not have the maximum value (No in step S10), the process returns to step S9. On the other hand, the shape of the surface of the second deformable mirror 21 is determined (step S11) when the detected signal of the photomultiplier 25 has the maximum value (Yes in step S10). Consequently, color aberration with respect to fluorescence from the sample 20 can be corrected.

Therefore, according to the first embodiment, one of the half mirror 12 and the dichroic mirror 13 can be selectively arranged on the optical path. Further, as the first step, the half mirror 12 is arranged on the optical path; the sample 20 is illuminated with the laser beam emitted from the laser beam source 10 through the half mirror 12, the first deformable mirror 15, and the objective lens 19; the light from the sample 20 is focused at the confocal pinhole 24 through the half mirror 12; and the shape of the surface of the first deformable mirror 15 is deformed in such a way that the light intensity of the light passing through the confocal pinhole 24 is maximized in order to shift the focusing position, which is on the sample 20, of the objective lens 19. Consequently, the aberration caused by the difference between the refractive index of the cover glass holding the sample 20 and the refractive index of the fluorescent sample, or by the difference between the refractive indices just mentioned and the refractive index of air, for example, can be corrected. Thus, the sample 20 is ideally illuminated with the illuminating light. Further, as the second step, the dichroic mirror 13 is arranged on the optical path; only the light with the fluorescent wavelength emitted from the sample 20 among the light from the sample 20 is focused at the confocal pinhole 24 through the dichroic mirror 13 and the second deformable mirror 21; and the shape of the surface of the second deformable mirror 21 is deformed in such a way that the light intensity of the light passing through the confocal pinhole 24 is maximized, in order to shift the focusing position at the confocal pinhole 24. Consequently, the color aberration with respect to the fluorescence from the sample 20 can be corrected. Thus, the shape of the surface of the first deformable mirror 15 and the second deformable mirror 21 are optimally set with respect to each of the illuminating light from the sample 20 and the fluorescence from the sample 20 through the first and the second steps, so that the focusing position of the objective lens can be shifted as well as the aberration due to the refractive indices and the color aberration can be corrected. Consequently, high-quality image of the sample can be obtained.

The shape of the surface of the deformable mirror is optimized for a specific wavelength. Hence, when the deformable mirror for correctly focusing the laser beam (illuminating light) onto the sample is arranged on a common optical path through which both of the illuminating light and a detected light pass, and a light with a different wavelength from that of the laser beam is detected as in the fluorescent observation, the detected light cannot be correctly focused on the confocal pinhole due to an influence of the deformable mirror. However, according to the first embodiment, the second deformable mirror 21 that works only on the detected light (fluorescence) is provided. Consequently, the aberration with respect to the fluorescence is corrected and the fluorescence can be correctly focused.

In the first embodiment, the controller 26 controls the shape of the surface of the first deformable mirror 15 and the second deformable mirror 21 in such a way that the electric signal from the photomultiplier 25 is maximized. In other word, the controller 26 controls the shapes in such a way that the light intensity of the light passing through the confocal pinhole 24 is maximized. On the other hand, for example, information on the shape of the surface of each of the first deformable mirror 15 and the second deformable mirror 21 obtained in the first and the second steps described hereinbefore can be stored in a database in the controller 26. Then, the shape of the surface of the first deformable mirror 15 and the second deformable mirror 21 can be controlled based on the information from the database. Here, the information stored in the database includes, for example, the focusing position of the objective lens 19; types of the sample 20; a spectrum of the fluorescent wavelength emitted from the sample 20; and the shape of the surface of the first deformable mirror 15 and the second deformable mirror 21 that are controlled to optimum states with respect to the information just mentioned.

Consequently, the shape of the surface of the first deformable mirror 15 and the second deformable mirror 21 can be optimally controlled based on the database. Hence, the aberration can be corrected by continuously shifting the focusing position of the objective lens 19 while arranging the dichroic mirror 13 on the optical path.

The light intensity of the light passing through the confocal pinhole 24 is maximized in steps S5 and S10 through the control of the shape of the surface of the deformable mirrors 15 and 21; however, a predetermined reference value may be set for the output signal from the photomultiplier 25. Then, the shape of the surface may be determined when the output signal exceeds the reference value.

In the first step, the half mirror 12 is selected by the optical element switching unit 101 in step S1 in order to guide the laser beam reflected by the sample to the confocal detecting unit. However, the dichroic mirror 13 for fluorescence detection often has a transmittance property of transmitting a small amount of the laser beam rather than totally blocking the laser beam. Then, even if the dichroic mirror 13 for fluorescence detection is selected, the process in the first step (steps S1 to S6) can be performed by removing the absorption filter 23 from the optical path since the photomultiplier 25, which is the detector, has an extremely high sensitivity.

Figure 3:
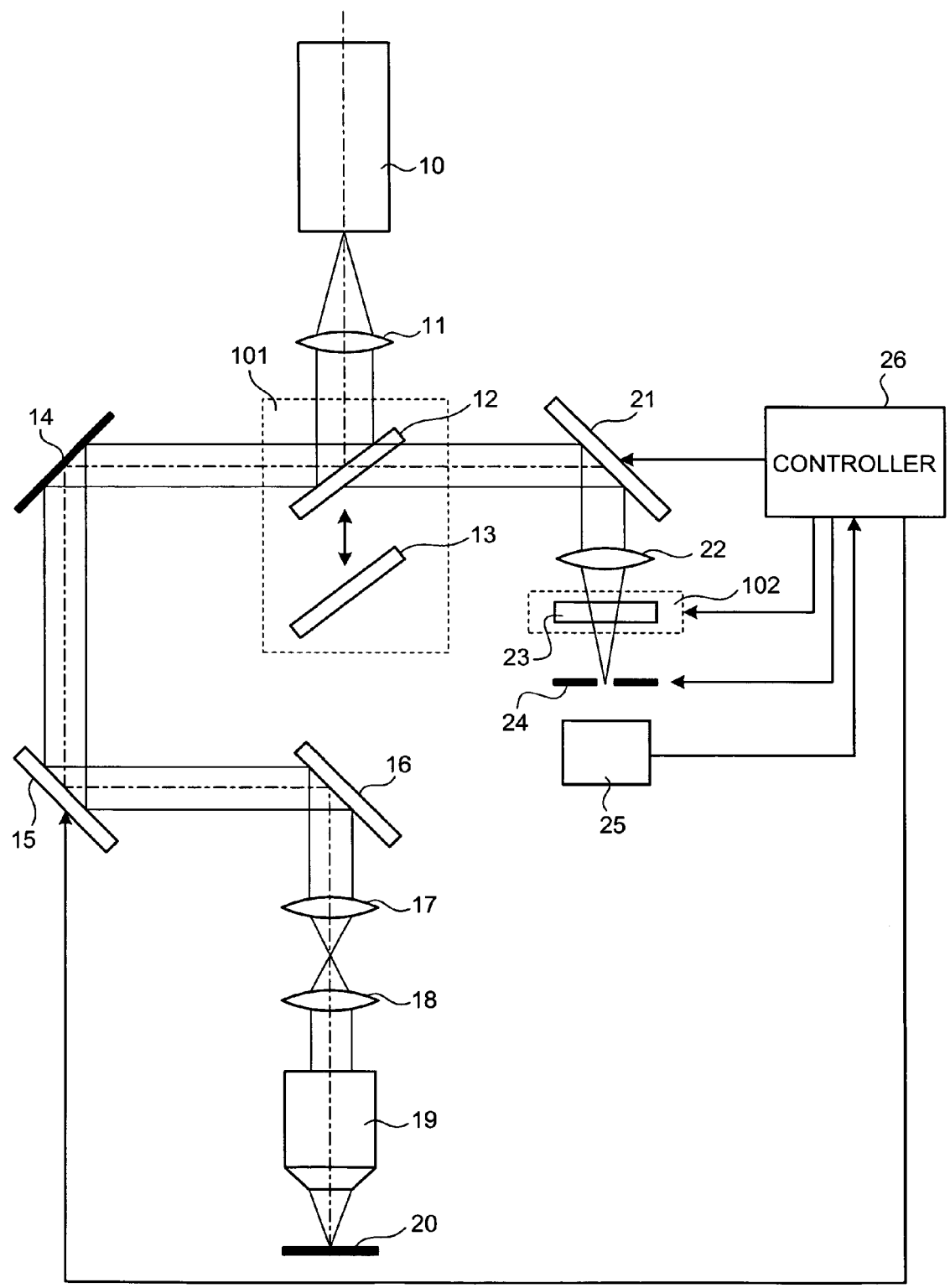
FIG. 3 is a schematic drawing showing a configuration of the laser scanning microscope according to a second embodiment of the present invention.

A second embodiment of the present invention is explained hereinafter. FIG. 3 shows a schematic configuration of the second embodiment of the present invention, and the same reference characters are assigned to portions that are identical to those of FIG. 1.

Here, a pinhole diameter of the confocal pinhole 24 can be changed by the controller 26 in conjunction with the deformation of the shape of the surface of the first deformable mirror 15. That is to say, when the focusing position of the objective lens 19 is changed by deforming the shape of the surface of the first deformable mirror 15, NA of the objective lens 19 is changed since the light incident on the objective lens 19 from the intermediate imaging lens 18 is not the parallel beam. Consequently, a diffraction diameter of the beam at the confocal pinhole 24 is slightly changed. Here, the real NA of the objective lens 19 can be calculated from the focusing position of the objective lens 19, and the diffraction diameter of the beam at the confocal pinhole 24 can be calculated from the NA.

Hence, when the focusing position of the objective lens 19 is shifted by changing the shape of the surface of the first deformable mirror 15, an ideal size of the confocal pinhole 24 is calculated by the controller 26 from the focusing position of the objective lens 19. Then, the diameter of the confocal pinhole 24 is adjusted based on the result of the calculation.

Consequently, the diameter of the confocal pinhole 24 can always be optimized in accordance with the focusing position of the objective lens 19 shifted by the first deformable mirror 15, so that only the focused light of the objective lens 19 can pass through the confocal pinhole 24. Hence, the resolving power in the direction of the optical axis of the objective lens 19, which is in the direction of Z-axis, can be secured, so that a high-quality image of the sample can be obtained.

On the other hand, plural absorption filters 23 having different absorption characteristics are provided. The plural absorption filters 23 are installed in a turret 102, so that each absorption filter 23 can be selected and arranged on the optical path. Here, the turret 102 arranges the absorption filter 23, which has absorption characteristics suitable for the sample 20, on the optical path based on a command from the controller 26 in conjunction with the deformation of the shape of the surface of the second deformable mirror 21.

Consequently, the absorption filter 23 suitable for the sample 20 can be arranged on the optical path, so that only a light with a predetermined wavelength spectrum in which the color aberration thereof is corrected by the second deformable mirror 21 can be guided to the confocal pinhole 24. Hence, a higher-quality image of the sample can be obtained.

The setting of the diameter of the confocal pinhole 24 and the arrangement of the optimum absorption filter 23 on the optical path are both performed in the second embodiment; however, it is possible to prepare and perform one of the setting and the arrangement.

Further, for example, plural images of the sample in the direction of the Z-axis can be obtained at different observation positions by actively shifting the focusing position of the objective lens 19 by the first deformable mirror 15. Here, only a light that matches the focal point of the objective lens 19 can be made to pass through the confocal pinhole 24 by setting an optimum diameter of the confocal pinhole 24 in accordance with the focusing position of the objective lens 19. Consequently, the resolving power in the direction of the Z-axis is secured, and a high-quality image of the sample can be obtained.

Figure 4:
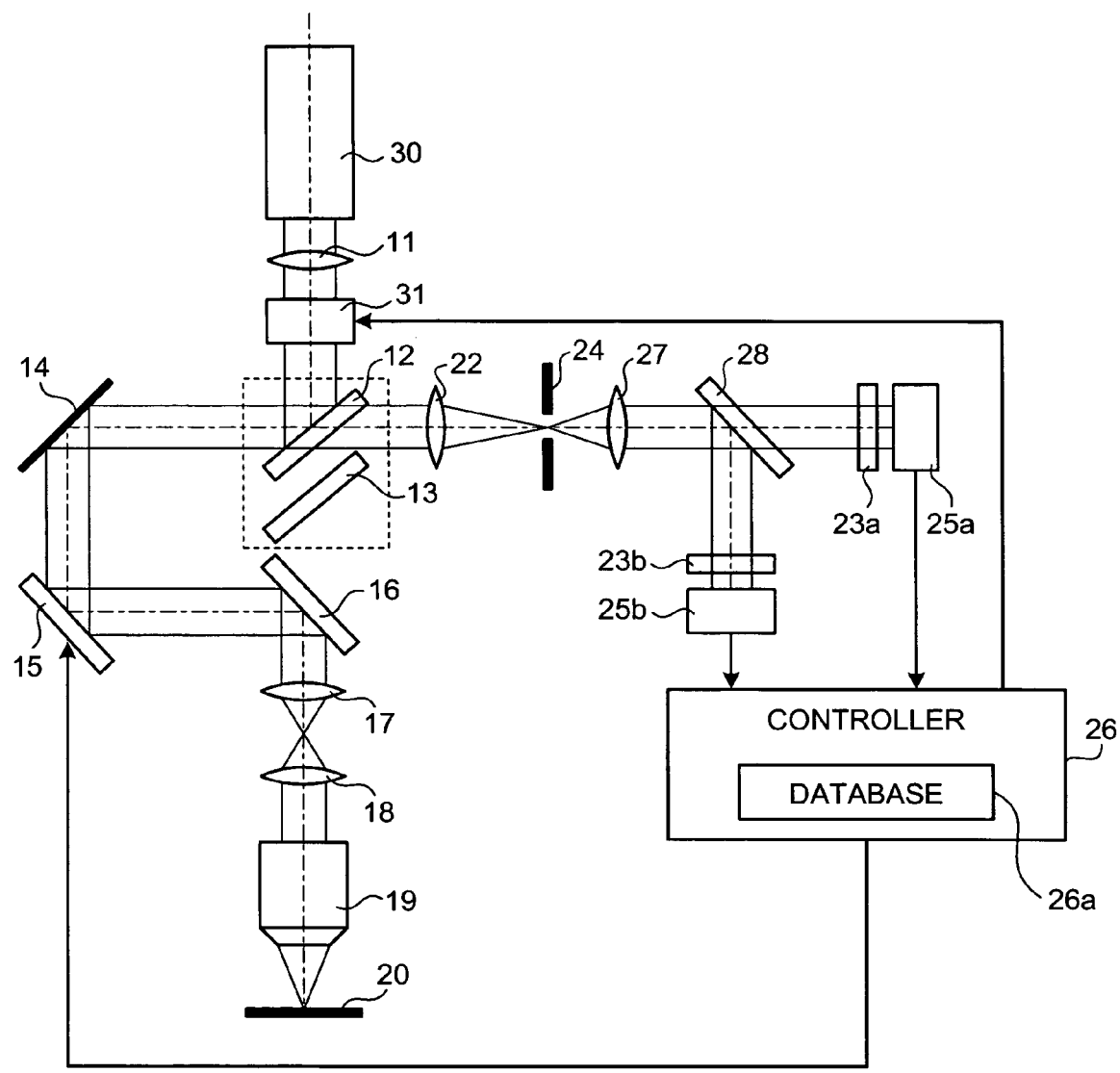
FIG. 4 is a schematic drawing showing a configuration of the laser scanning microscope according to a third embodiment of the present invention.

A third embodiment of the present invention is explained hereinafter. FIG. 4 is a schematic drawing showing a configuration of the laser scanning microscope according to the third embodiment of the present invention. The same reference characters are assigned to portions that are identical to those of FIG. 1.

In FIG. 4, a multiwavelength laser beam source, which is represented by "30", generates a laser beam with plural wavelengths. The multiwavelength laser beam source 30 may have a configuration that plural laser beam sources each having different single wavelength are arranged and each laser beam is combined into one optical axis by a mirror and the like. The multiwavelength laser beam from the multiwavelength laser beam source 30 comes into a wavelength selecting unit 31 such as an AOTF (Acousto-Optical Tunable Filter) after transmitted through the collimate optical system 11. Then, a laser beam with a predetermined wavelength is selected and output by the wavelength selecting unit 31. The selected laser beam is guided to the objective lens 19 through the half mirror 12 or the dichroic mirror 13, the deformable mirror 15 that is the focusing position control unit, and the optical scanning unit 16, sequentially. Then, the sample 20 is illuminated with the selected laser beam.

Further, the shape of the surface of the deformable mirror 15 is stored in a database 26a of the controller 26, and the shape can be controlled. The database 26a stores the optimal setting of the shape of the surface of the deformable mirror 15 for each wavelength of the laser in order to focus the laser beam with different wavelength from the multiwavelength laser beam source 30 at the same position on the sample 20 in the direction of the optical axis. Therefore, the controller 26 reads out the shape of the surface of the deformable mirror 15 that corresponds to the wavelength of the laser beam selected by the wavelength selecting unit 31 from the database 26a. Then, the controller 26 can control to set the shape of the surface of the deformable mirror 15.

Further, a collimator lens 27 that converts a light passing through the confocal pinhole 24 to a parallel beam and a dichroic mirror 28 that splits the parallel beam in accordance with a wavelength are provided as the detecting unit. Absorption filters 23a, 23b, and photomultipliers 25a, 25b are arranged on each of the transmitting optical path and the reflecting optical path of the dichroic mirror 28. Observation light with two different wavelengths can be detected simultaneously by suitably setting wavelength properties of the dichroic mirror 28, the absorption filters 23a, 23b.

For example, in an observation of a multi-color stained fluorescent sample, two types of laser wavelengths $\lambda 1$ and $\lambda 2$ are selected as an exciting light, and scanning is performed by the optical scanning unit. Fluorescence is generated in response to the light beam of each exciting wavelength. The generated fluorescence is detected for image formation. When one wishes to sequentially detect different fluorescent wavelengths for each line of the raster scan by switching the laser wavelength, the line is first scanned in the X-direction only by the laser wavelength $\lambda 1$ for fluorescence detection, and then the same line is scanned by the laser wavelength $\lambda 2$ for fluorescence detection. Then, the scanning is shifted in the Y direction by one pixel, and a new line is scanned twice in the X-direction sequentially by the laser wavelengths $\lambda 1$ and $\lambda 2$. The procedure just mentioned is repeated to generate an image of one frame for each of the laser wavelengths $\lambda 1$ and $\lambda 2$. Here, the wavelength of the laser beam is required to be switched rapidly in synchronization with the laser scanning. Generally, a deformable mirror can finish deforming within a time period of an order of milliseconds (msec). Hence, according to the configuration of the third embodiment, the first deformable mirror 15 is switched to have other shape corresponding to the rapid switching of the wavelengths, so that it is possible to focus the laser beam with each wavelength on the sample 20 at the same position along the direction of the optical axis.

Consequently, even if the multiwavelength laser beam is used, the laser beam with each wavelength can scan the sample 20 at the same position along the direction of the optical axis by using the laser scanning microscope according to the third embodiment. That is to say, the laser beam with different wavelength is sequentially emitted, so that the fluorescence corresponding to each of the wavelength can be obtained for an identical observation cross-section.

Figure 5:
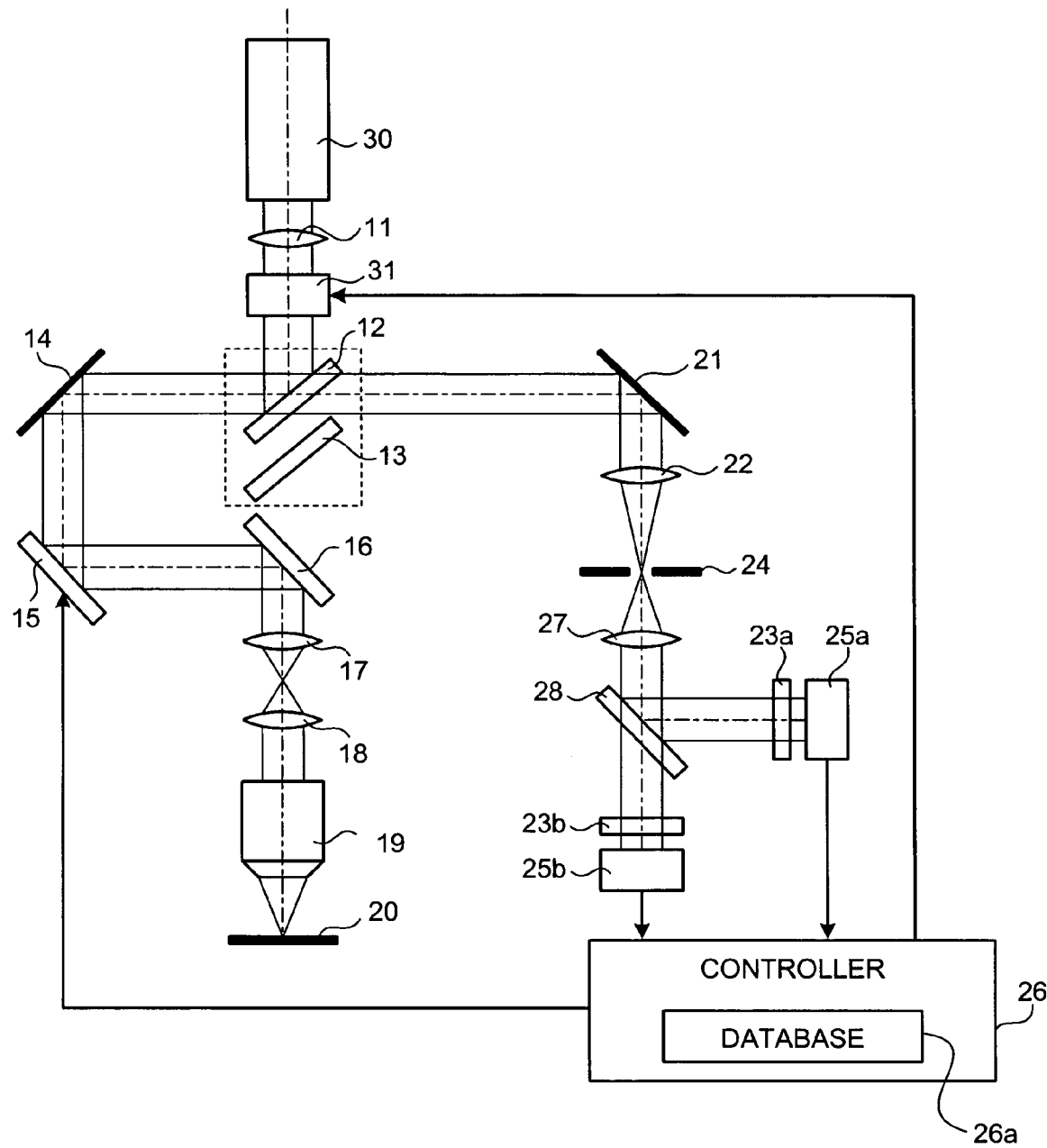
FIG. 5 is a schematic drawing showing a modification of the laser scanning microscope according to the third embodiment of the present invention.

Further, in the third embodiment, accuracy of detection can be improved since the color aberration of the detected fluorescent wavelength can be corrected when the fluorescent sample is scanned by providing the second deformable mirror 21 that corrects the color aberration on the detecting optical path as shown in FIG. 5. Here, the suitable shape of the deformable mirror 21 for each fluorescent wavelength can be stored in the database 26a of the controller 26 to control the switching of the shape of the deformable mirror 21 in synchronization with the switching of the wavelength.

The present invention is not limited to the embodiments described hereinbefore, and various modifications may be made in practice without departing from the scope of the present invention. For example, although the half mirror 12 and the dichroic mirror 13 that are to be arranged on the optical path are switched manually with each other by the optical element switching unit 101, the half mirror 12 and the dichroic mirror 13 can be switched automatically by a motor not shown that is driven by the controller 26.

Further, various aspects of the present invention are described in the above embodiments. Still further aspects can be extracted when above-described elements are suitably combined. For example, even when some elements of the embodiments are eliminated, as far as the remaining elements solve the problem and achieve the effect mentioned in the Background of Invention, the remaining elements may be deemed to constitute one aspect of the invention.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A laser scanning microscope comprising:
   a light source that generates a laser beam;
   an objective lens that focuses the laser beam on a sample;
   an optical scanning unit that two-dimensionally scans the sample with the laser beam;
   a first focusing-position control unit, which is provided on an optical path of the laser beam, and which shifts a first focusing position of the laser beam on the sample in a direction of an optical axis of the objective lens;
   a splitter element, which is arranged between the light source and the optical scanning unit, and which splits at least one of: (i) an observation light that is emitted from the first focusing position and that has a wavelength different from a wavelength of the laser light, and (ii) a reflected light that is reflected from the first focusing position, from the optical path of the laser beam;
   a confocal detecting unit that has a confocal aperture for confocal detection of light from the first focusing position;
   a second focusing-position control unit, which is provided on an optical path between the splitter element and the confocal aperture, and which matches a second focusing position of the observation light with the confocal aperture, such that the observation light is focused with respect to the confocal detecting unit; and
   a light selecting unit that selects the light detected by the confocal detecting unit.

2. The laser scanning microscope according to claim 1, further comprising a control unit, which: (i) in a state in which the reflected light is caused to reach the confocal detecting unit, controls the first focusing-position control unit to shift the first focusing position so that an amount of light passing through the confocal aperture is maximized with respect to the reflected light of the laser beam reflected at the first focusing position, and (ii) in a state in which the observation light is caused to reach the confocal detecting unit, controls the second focusing-position control unit to shift the second focusing position so that an amount of light passing through the confocal aperture is maximized with respect to the observation light emitted from the first focusing position.

3. The laser scanning microscope according to claim 2, wherein the control unit performs control to change a size of the confocal aperture in conjunction with the shifting of the first focusing position by the first focusing-position control unit.

4. The laser scanning microscope according to claim 2, wherein the light selecting unit includes a plurality of wavelength selecting filters, each of which has a different characteristic, and wherein the control unit performs control to arrange, on an optical path one of light entering the confocal detecting unit, one of the wavelength selecting filters having a characteristic suitable for the sample from among the wavelength selecting filters, in conjunction with the shifting of the second focusing position by the second focusing-position control unit.

5. The laser scanning microscope according to claim 4, wherein at least one of the first and the second focusing-position control units comprises a wavefront modulator that deforms a reflecting surface thereof in accordance with an applied voltage.

6. The laser scanning microscope according to claim 5, wherein the control unit includes a database that stores information regarding a shape of the reflecting surface of the at least one wavefront modulator, and the control unit reads the information regarding the shape from the database and controls the at least one wavefront modulator based on the information regarding the shape of the reflecting surface read from the database.

7. The laser scanning microscope according to claim 6, wherein the database stores information regarding plural shapes of the reflecting surface of the wavefront modulator, each of the shapes corresponding to a given wavelength of the laser beam and a focusing position.

8. The laser scanning microscope according to claim 1, wherein the splitter element includes:
   a half mirror that splits the reflected light from the first focusing position from the optical path of the laser beam; and
   a dichroic mirror that splits light with a predetermined wavelength as the observation light from the optical path of the laser beam, and
   wherein the light selecting unit comprises a mechanism to switch the half mirror and the dichroic mirror to be selectively placed between the light source and the optical scanning unit.

9. The laser scanning microscope according to claim 1, wherein at least one of the first and the second focusing-position control units comprises a wavefront modulator that deforms a reflecting surface thereof in accordance with an applied voltage.

10. The laser scanning microscope according to claim 9, further comprising a control unit that includes a database that stores information regarding a shape of the reflecting surface of the at least one wavefront modulator, wherein the control unit reads the information regarding the shape from the database and controls the at least one wavefront modulator based on the information regarding the shape of the reflecting surface read from the database.

11. The laser scanning microscope according to claim 10, wherein the database stores information regarding plural shapes of the reflecting surface of the wavefront modulator, each of the shapes corresponding to a given wavelength of the laser beam and a focusing position.

12. A laser scanning microscope comprising:
    a light source that generates a multiwavelength laser beam containing plural wavelengths;
    a wavelength extracting unit that extracts a laser beam with at least one of the plural wavelengths from the multiwavelength laser beam;
    an objective lens that focuses the extracted laser beam on a sample;
    an optical scanning unit that two-dimensionally scans the sample with the extracted laser beam;
    a first focusing-position control unit, which is provided on an optical path of the extracted laser beam and comprises a wavefront modulator, and which shifts a focusing position of the extracted laser beam on the sample in a direction of an optical axis of the objective lens so as to eliminate a deviation in the direction of the optical axis of the focusing position of the extracted laser beam with respect to a reference focusing position of a laser beam with a reference wavelength, for each wavelength of the at least one wavelength of the extracted laser beam;
    a splitter element, which is arranged between the light source and the first focusing-position control unit, and which splits an observation light that is emitted from the focusing position of the extracted laser beam from the optical path of the laser beam, the observation light having a different wavelength from the extracted laser beam;

a confocal detecting unit that has a confocal aperture for confocal detection of light from the focusing position; and a light selecting unit that selects the light detected by the confocal detecting unit.

13. The laser scanning microscope according to claim 12, further comprising a second focusing-position control unit, which is provided on an optical path between the splitter element and the confocal aperture, and which matches a focusing position for detection of the observation light with the confocal aperture such that the observation light is focused with respect to the confocal detecting unit.

14. The laser scanning microscope according to claim 12, further comprising a control unit which controls the wavelength extracting unit to sequentially extract, from the multiwavelength laser beam, laser beams each having a respective one of the plural wavelengths, and which controls the first focusing-position control unit to eliminate a deviation of the focusing position for each of the sequentially extracted laser beams having the respective wavelengths.

15. The laser scanning microscope according to claim 14, wherein the control unit performs control to change the wavelength of the laser beam extracted by the wavelength extracting unit for every one line of scanning performed by the optical scanning unit.

16. The laser scanning microscope according to claim 13, wherein the second focusing-position control unit comprises a wavefront modulator that deforms a reflecting surface thereof in accordance with an applied voltage.

17. The laser scanning microscope according to claim 12, further comprising a control unit that includes a database that stores information regarding a shape of a reflecting surface of the wavefront modulator, wherein the control unit reads the information regarding the shape from the database and controls the wavefront modulator based on the information regarding the shape of the reflecting surface read from the database.

18. The laser scanning microscope according to claim 17, wherein the database stores information regarding plural shapes of the reflecting surface of the wavefront modulator, each of the shapes corresponding to one of the plural wavelengths and a focusing position.

19. A control method for a laser scanning microscope, comprising:

focusing a laser beam emitted by a light source on a sample through an objective lens;

performing confocal detection of light emitted from a first focusing position at the sample through a confocal aperture while two-dimensionally scanning the first focusing position of the laser beam on the sample;

causing reflected light, which is reflected at the first focusing position, to pass through the confocal aperture, and shifting the first focusing position in a direction of an optical axis of the objective lens so that an amount of the light passing through the confocal aperture is maximized with respect to the reflected light of the laser beam reflected at the first focusing position; and causing observation light, which is emitted from the first focusing position and which has a wavelength different from a wavelength of the laser light, to pass through the confocal aperture, and shifting a second focusing position of the observation light on the confocal aperture in a direction of an optical path of the observation light so that an amount of the light passing through the confocal aperture is maximized with respect to the observation light.

* * * * *